United States Patent [19]

Belden, Jr.

[11] 4,146,330
[45] Mar. 27, 1979

[54] OPTICAL METHOD AND APPARATUS FOR SURFACE ROUGHNESS EVALUATION

[75] Inventor: Lorne H. Belden, Jr., Louisville, Ky.

[73] Assignee: General Electric Company, Louisville, Ky.

[21] Appl. No.: 856,436

[22] Filed: Dec. 1, 1977

[51] Int. Cl.² .................................................. G01N 21/48
[52] U.S. Cl. .................................................... 356/445
[58] Field of Search ....................... 356/120, 209, 212

[56] References Cited

U.S. PATENT DOCUMENTS 3,999,864  12/1976  Mutter ................................. 356/209

FOREIGN PATENT DOCUMENTS 2264030  7/1974  Fed. Rep. of Germany ........... 356/120

OTHER PUBLICATIONS

Hensler et al., "A Laser Specular Reflectometer for Ceramic Surface Diagnostics", *Ceramic Bulletin*, vol. 52, No. 2 (1973), pp. 191-194.

*Primary Examiner*—John K. Corbin
*Assistant Examiner*—R. A. Rosenberger
*Attorney, Agent, or Firm*—Frederick P. Weidner; Radford M. Reams

[57] ABSTRACT

A method and apparatus for optically evaluating surface roughness by the use of specular reflections particularly adpated to curved surfaces such as shafts or tubes. This is accomplished by directing a beam of parallel, monochromatic, plane polarized light onto the test surface at two different angles and detecting the relative intensity of the specular reflections at the respective angles of reflection by a pair of suitably located detectors. A signal is then generated corresponding to the ratio of the intensities of the specular reflections which are shown to correspond to the surface roughness independently of surface color. In the preferred embodiment, the differing angles of incidence are created by directing a laser beam at a portion of a suitably positioned round shaft, portions of the beam intercepting different portions of the shaft at different angles of incidence, with the detectors located along corresponding axes of reflection. The detector signals are divided by electronic circuitry to provide a signal which corresponds to the surface roughness independently of surface color.

15 Claims, 6 Drawing Figures

OPTICAL METHOD AND APPARATUS FOR SURFACE ROUGHNESS EVALUATION

BACKGROUND DISCUSSION

This invention concerns methods and apparatus for the evaluation of surface roughness characteristics by non-contacting or optical means.

The conventional approach in the determination of surface roughness characteristics for industrial applications is by use of a Profilometer surface roughness gauge which in mechanical stylus is traversed across the surface to be measured with an electrical transducer reading the micromovement of the stylus. As the peaks and valleys are traversed, the readings obtained from this apparatus produce a standardized number value corresponding to the roughness of the surface measured. This is the root mean square or $\sigma$ standard unit to specify surface roughness.

The major application of surface roughness measuring equipment is in the manufacture of machined parts, since for many moving parts such as compressor pump shafts supported within bearings, surface roughness is the crucial factor in determining the life of the parts in service.

The conventional approach utilizing a stylus gauge has many disadvantages in the context of industrial or manufacturing applications. These include the delicate nature of the gauge producing unsatisfactory performance under rough service with many parts being gauged; the output signal does not yield a single signal output corresponding to surface roughness, but rather a continuously varying output as each surface irregularity is traversed, and accordingly an average dwell must be derived in order to provide a surface roughness indicator signal. In addition, the precise nature of the set up and alignment of the stylus and the test surface precludes good repeatability of readings obtainable in the factory environment where, typically with heavy building, vibrations are present.

The Profilometer surface roughness measuring instruments also require a relatively high degree of skill and it is quite time consuming to obtain measurements.

For this reason, the usual approach in achieving quality control in the manufacture of parts is to sample parts within a production lot, with scrapping or reworking of the entire lot, if the surface roughness of the sample parts do not measure up to the proper standards. This is inefficient and wasteful since an error in set up or procedures of the machining or grinding operation may be allowed to continue for an entire lot before correction of the problem. In addition, the good parts within a lot are either scrapped or required to be reworked.

Accordingly, it has heretofore been proposed in many prior art patents to provide a noncontacting or optical surface roughness measurement device and method which would obviate many or most of the above-described deficiencies. However, heretofore no such optical or noncontacting instrument has successfully provided an alternative to the mechanical approach for use in industrial applications.

The usual prior art approach has been to measure the ratio of specular to diffuse light level reflected from the surface which roughness is to be determined, upon illuminating the surface with an incident beam from a light source. The principle relied on is that the rougher the surface, the proportion of the light reflected specularly decreases as the surface becomes rougher.

The use of the proportion of specular to diffuse reflection rather than simply sensing the change in specular reflection intensity eliminates the effect of surface coloration and illuminating beam intensity variations.

While this is a theoretically adequate principle, as a general proposition, the need to sense the diffuse component of reflected light with its relatively low intensity, has precluded reliable performance of such devices. In addition, many machined parts have a characteristic lay to the roughness, i.e., grinding marks in a certain direction, which greatly affect the character of the diffused reflected light.

Many of these patents accordingly scan the surface at various oblique angles to develop a diffuse specular analysis.

Examples of various approaches using this basic principle are found in U.S. Pat. Nos. 3,804,521; 3,229,564; 3,771,880; 3,746,869; 3,591,291 and 3,850,526.

It has also been proposed to measure surface roughness based on the intensity of the specular component alone by the use of a constant intensity light source of a known wavelength, i.e., a laser source. This is described in an article in *Ceramic Bulletin*, "A Laser Reflectometer for Ceramic Surface Diagnostics", Volume 52, No. 2 (1973) pages 191 to 194.

This approach ignores the effect of variations in source intensity, however, which would lead to inaccurate results. In addition, it depends on the constant overall reflectivity of the surface as due to coloration rather than surface roughness which further would contribute to errors in such systems.

As noted above, the most common application of surface roughness measurement for industrial applications is in bearing surfaces which is most usually shafts having a circular cross section. It would be highly advantageous if any such apparatus and method could be directly applicable to such round shafts such that the device or method could be readily adapted to 100% inspection or combined with machine controls so as to produce an in-process gauging of parts.

It is accordingly an object of the present invention to provide a noncontacting optical method and apparatus for determining surface roughness which will produce a highly reliable evaluation of the roughness of surfaces at workpieces inspected.

It is another object of the present invention to provide an optical noncontaining surface roughness apparatus and method which does not rely on the detection of the diffuse component of the light reflected from the surface.

It is yet another object of the present invention to provide such an optical method and apparatus which is not affected by variations in the surface color, the character of the surface irregularities or in the intensity of the source utilized to illuminate the surface.

It is yet another object of the present invention to provide such an optical method and apparatus which is particularly adapted to rounded surfaces and which quickly and easily produces a surface roughness evaluation which is highly reliable and requires minimal skill to accurately interpret.

SUMMARY OF THE INVENTION

These and other objects of the present invention, which will become apparent upon a reading of the following specification and claims, are accomplished by a method and apparatus in which a monochromatic, parallel light beam is directed at the surface whose roughness is to be measured, at two differing incident angles. In the preferred embodiment, this is accomplished by the directing of the illuminating beam at a curved portion of the test surface so that portions of the beam are incident at differing angles with respect to the curved surface. The intensity of the specular component of each of the portions of the reflected light beam is sensed by photodetectors aligned with each angle of reflection corresponding to each of the angles of incidence and by generating a signal corresponding to the relative intensities of each of the specular components of the reflected light. An indication is produced of the roughness of the surface which is independent of variations in the color of the surface of the lay of the surface irregularities. The light beam source preferably produces a beam plane polarized perpendicular to the incident plane, that is, the plane formed by the local surface normal and the incident beam. The apparatus includes a fixture for workpieces such as ground shafts which a slotted opening in a cylindrical recepticle correctly positions the shaft with respect to the source and detectors such as to provide a fixtured set up readily adaptable to industrial situations.

DETAILED DESCRIPTION

Figure 4:
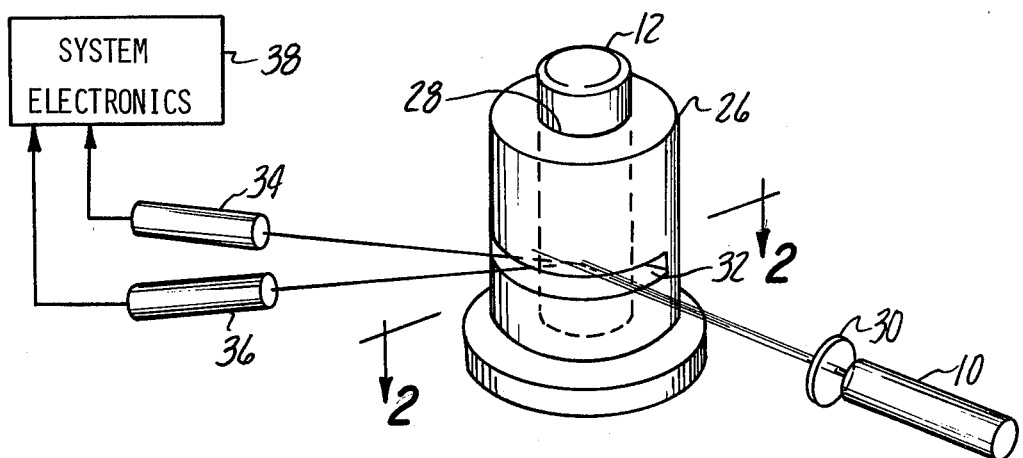
FIG. 4 is a perspective simplified representation of the apparatus according to the present invention, including fixturing for positioning the test shaft.

In the following detailed description, certain specific terminology will be utilized for the sake of clarity and a specific embodiment described in accordance with the requirements of 35 USC 112, but it is to be understood that the same is not intended to be limiting and should not be so construed inasmuch as the invention is capable of taking many forms and variations within the scope of the appended claims.

In the article in the *Ceramic Bulletin*, "A Laser Specular Reflectometer for Ceramic Surface Diagnostics", referred to above, there is referenced a treatise on the modern theoretical analysis of the effect of surface roughness on the specular reflection of the incident parallel light beam from a surface. This treatise, *Scattering of Electromagnetic Waves from Rough Surfaces*, P. Beckman and A. Spizzichino, sets forth that the light specularly reflected from a relatively smooth surface at a given angle $\theta$ may be described by the following equation:

$$I_s = R\, I_{in}\, \exp\left[-\left(\frac{4\pi\sigma}{\lambda}\cos\theta\right)^2\right] \quad (A)$$

where:

$I_s$ = the intensity of specularly reflected light
$R$ = the reflectivity of smooth surface (dependent on color of samples)
$I_{in}$ = the incident intensity on surface
$\sigma$ = the rms surface roughness of surface
$\theta$ = the angle of incidence
$\lambda$ = the wavelength of radiation Certain simplifying assumptions are made in the development of this equation, i.e., that a Gaussian distribution of irregularities exist, and that the wavelength of the electromagnetic waves are small with respect to the gross contours of the surface.

It can be seen that the angle of incidence $\theta$, the reflectivity of the surface R due to color, and the intensity $I_{in}$ of the incident beam are all factors in addition to surface roughness which would control the intensity of the specularly reflected component of the incident beam.

In order to eliminate the factor R, it is proposed by the present inventor that a parallel beam monochromatic light be directed at a surface at differing angles of incidence $\theta$, and with the intensity of the specularly reflected light at each of the angles of reflections sensed.

If this is done, then the intensity ratio may be described by the following equation:

$$R_I = \frac{I_{S1}}{I_{S2}} = \frac{R\, I_{1N1}}{R\, I_{1N2}}\; \frac{\exp\left[-\left(\frac{4\pi\sigma}{\lambda}\cos\theta 1\right)^2\right]}{\exp\left[-\left(\frac{4\pi\sigma}{\lambda}\cos\theta 2\right)^2\right]} \quad (B)$$

$$= \exp\left[\left(\frac{4\pi\sigma}{\lambda}\right)^2 (\cos^2\theta_2 - \cos^2\theta_1)\right]$$

The intensity ratio $I_{R1}/I_{R2}$ then varies only as the surface roughness if the two incident angles $\theta_1$, $\theta_2$, the ratio of the incident intensities $I_{1N1}/I_{1N2}$ and the source wavelengths are unchanged.

Accordingly, the effect of variations in surface reflectivity due to color has been removed such that the relative intensities correspond directly to surface roughness regardless of the reflectivity of the surface. It is noted that while a correspondence between the specular intensity and surface roughness would exist, a direct correlation with $\sigma$ in root mean square values may not directly be derivable. This is because the surface irregularities may or may not be distributed as assumed in a Gaussian distribution.

This arrangement may be further enhanced in the context of detecting the surface roughness of nonplanar surfaces such as curved shafts. By another feature of the present invention, an incident beam of a given diameter is directed at the curved surface, with a portion of a beam striking the curved surface at differing angles of incidence, to thereby simultaneously create specular reflections and different angles of reflection from portions of the curved surface.

Thus, if a monochromatic parallel beam is utilized, the intensity of the incident beam is the same and the wavelength is the same such that the surface roughness alone controls the ratio of the specular components of the beam by sensing these intensities at different points located such as to intercept the specular component at angles of reflection corresponding to the differing angles of incidence. A signal may be generated corresponding to surface roughness.

Figure 1:
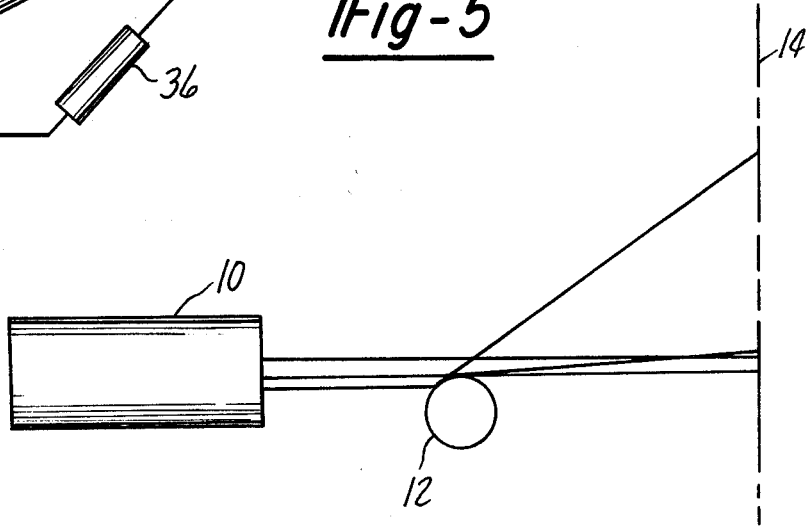
FIG. 1 is a diagrammatic representation of the apparatus according to the present invention showing the relationship between the light beam source, the workpiece and the photodetectors.

This is diagrammatically depicted in FIG. 1 in which a laser source 10 directs a beam shown of greatly exaggerated diameter of single wavelength electromagnetic waves at a transversely extending test shaft 12, positioned so as to intercept a portion of the beam and allowing a portion of the beam to pass by the surface of the test shaft as indicated in FIG. 1.

Figure 2:
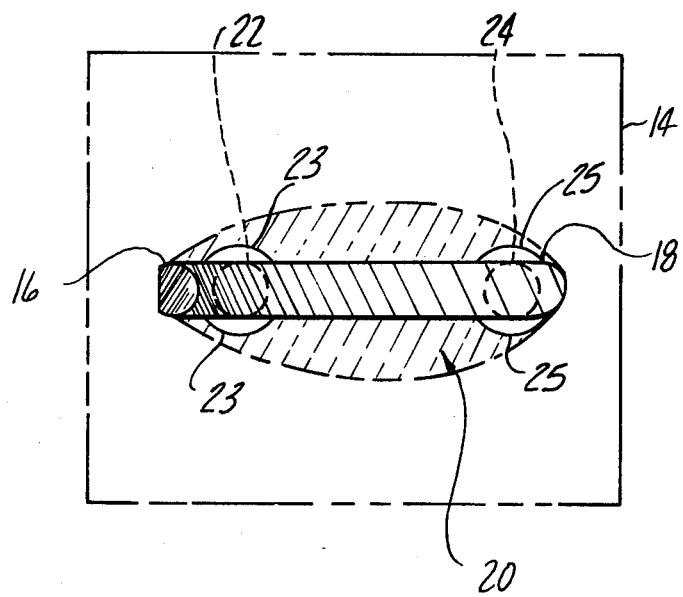
FIG. 2 is a graphical representation of the dispersal of the spectral component of the reflected portions of the light beam and the position of the photodetector.

The resultant reflection pattern of that portion of the beam intercepted by the beam shaft 12 can be seen in FIG. 2 in which a detection plane 14 is graphically represented. The portion of the beam which passes by the shaft 12 is represented by region 16 as the darker or more intense area. To one side of the region 16 is a narrow band 18, the width of which represents the specular component of that portion of the beam reflected from the surface of the shaft 12 which is dispersed by being reflected at a continuous range of reflection angles corresponding to the range of the angles of incidence as the various portions of the outer curvature of the shaft 12 are illuminated with portions of the beam.

That is, portions of the beam specularly reflected from the shaft are dispersed by virtue of the variation in the angle of incidence encountered by different portions of the beam being reflected from differently sloping portions of the curved outer surface of the shaft 12.

Figure 3:
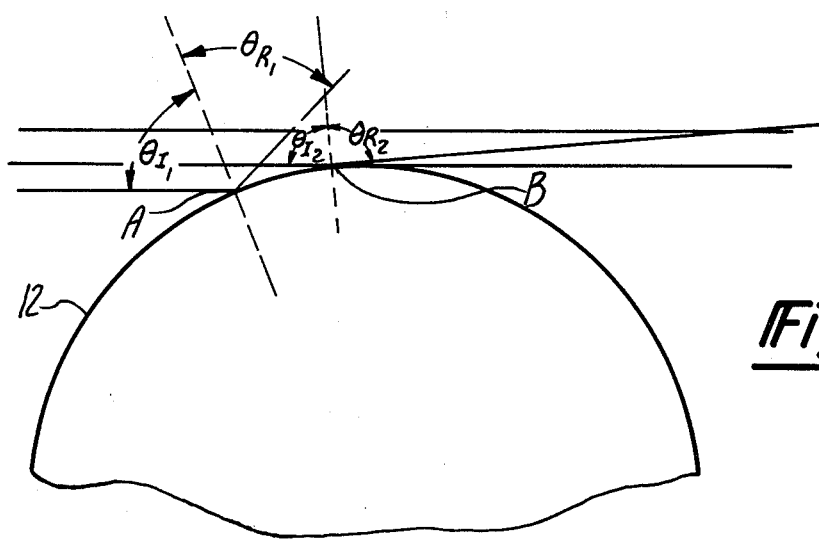
FIG. 3 is a diagrammatic representation of the relationship between the illuminating beam and the workpiece surface.

This is best seen in FIG. 3 where the lowermost portion of the beam intercepts the shaft 12 outer diameter at a point A, with the angle between the beam and the centerline of the shaft 12 comprising the angle of incidence $\theta I_1$ with the equal angle of reflection $\theta R_1$ being the angle at which that portion of the beam is reflected from the surface. The upper portion of the beam intercepts the outer portion of shaft 12 diameter at point B and it can be seen that the angle of incidence $\theta I_2$ and the angle of reflection $\theta R_2$ are much greater.

Since the reflectivity of the surface varies such as to be greater for greater angles of incidence as per the above equations, the specular components of the reflected light beam within the region 18 varies within the detection plane 14. That portion of the detection plane 14 receiving the portion of the beam impinging on the shaft 12 surface at greater angles of incidence is less intense than that receiving. This situation is reflected in the shading of FIG. 2 within the region 18 in which the lefthand side of the region 18 is darker or more closely shaded to reflect the relationship of intensities of the specular portion of the region 18.

Surrounding the band 18 is a region 20 in which the diffuse component of the reflected beam would be scattered at a much lower intensity than that within either band 18 or the region 16.

From the above development of the equations, it can thus be seen that if detectors are placed at 22 and 24 within the band region 18, a signal corresponding to the relative intensities of the specularly reflected portions of the beam could be obtained. Since these detectors would preferably be masked to limit light collection to the specular beam, areas of shadow 23 and 25 would be present.

This relationship in intensity varies in correspondence only when the surface roughness illuminated by the test beam. While the region within the band 18 receives some diffuse reflection, this component should be minor since it rapidly attenuates with distance and the detectors would thus obtain the intensity ratios $IR_1$ and $IR_2$.

Signals corresponding to surface roughness are thus derived solely by the detection of specular components of the reflected light beam and as noted are independent of the color reflectivity of the surface. The precise correlation of this signal value to rms value would of course depend on the particular wavelength of the source, the ranges of the angles of incidence which in turn are determined by the geometry relationship between the beam and the outer surface of the shaft 12. In addition, as noted the nature of the surface irregularities may render the above equation not directly applicable, since the assumption of a Gaussian distribution may not hold.

Thus, while the signal corresponding to the intensity ratio of two points within the region 18 receiving the specular reflection affords a means for noncontacting optical evaluation of surface roughness in accordance with the above-cited objects of the present invention, a direct correlation with rms values may or may not be achievable.

Figure 5:
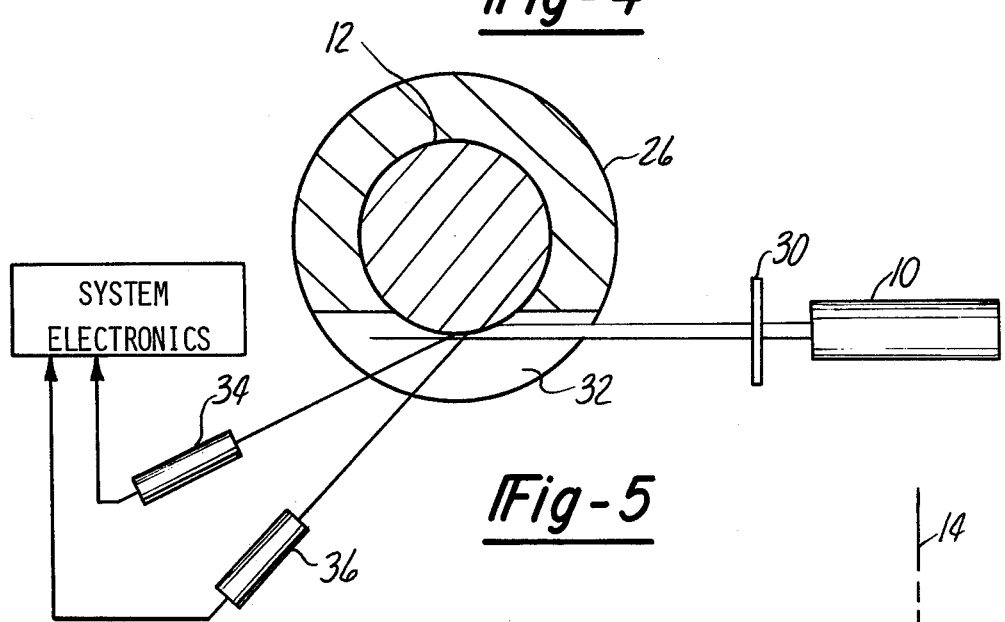
FIG. 5 is a view of the section 5—4 taken in FIG. 4.

FIGS. 4 and 5, in diagrammatic form, depict an implementation of the above-described concept whereby surface finish testing may be carried out on shafts by the simple insertion and removal of the shafts in the test fixturing. This apparatus includes a fixture 26 preferably formed of a hard, wear resistant material such as tungsten carbide with a precisely ground bore 28 machined thereinto of a size adapted to receive the test shaft 12 and precisely position it with respect to the other components.

The laser source 10 directs a parallel or collimated beam of monochromatic light through a plane polarizing filter 30 and into contact with the test shaft 12 via a slot opening 32 machined into the test fixture 26.

The slot opening extends into the bore 28 as shown in FIG. 5 so that the surface of the shaft 12 is exposed.

An He-Ne laser source is utilized producing a 6,328 angstroms wavelength light beam plane polarized by passing through the filter 30 so as to be perpendicular to the incident plane. This polarizing has been found to produce the best results. Either a separate polarizing filter 30 could be used or a laser source 10 having a stabilized, polarized output, i.e., such as laser source equipped with Brewster windows, could be used.

The laser source 10 is aligned with the slot 32 such that the beam partially intersects the outer contour of the shaft 12 as indicated in FIG. 5 to produce the diverging specular reflection of a portion of a beam from the laser source 10.

A pair of photodetectors 34 and 36 are located at selected angles of reflectance to provide means for generating signals corresponding to the intensity of the specular component of the reflected beam at two differing angles of reflection corresponding to two differing angles of incidence of portions of the beam since the photodetectors 34 and 36 occupy a finite area, they receive light from angles of incidence and reflection angles through a range, albeit slight, rather than a single angle of incidence and reflection, but for purposes of simplicity, can be assumed to be equivalent to that centered on the axis of each of these areas.

Each photodetector is masked and a narrow band optical filter utilized to minimize the effects of scattered light and ambient light of the photodetector output signals.

The output signal of photodetectors 34 and 36 is processed by the system electronics to produce an output signal corresponding to the surface roughness. This could be either in the form of a root mean square or rms figure, in which case the angles of incidence and wavelengths of the source must be computed as per the above equations to produce a signal corresponding to the surface roughness factor, if this relationship bears out in the particular application.

Figure 6:
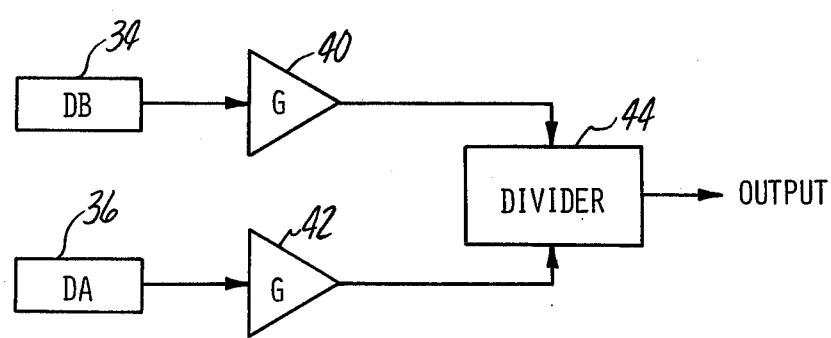
FIG. 6 is a block diagram representation of the signal processing electronics associated with the photodetectors in the apparatus according to the present invention.

This system of electronics would include a divider circuitry such as depicted in FIG. 6 in which the photodetector output signals 34 and 36 are amplified in amplifiers 40 and 42 and then electronically divided by divider 44 to produce an output signal which corresponds to the ratio relative intensity of the specular components sensed at the different angles of incidence and reflection of portions of the test beam.

It can be seen that the use of a single beam inherently produces monochromatic beams and of the same incident intensity, and simultaneously produces an illumination of the test surface at two different angles of incidence such that with a single source 10, the surface roughness determination can be carried out.

While this has particular advantage in measuring the roughness of machine shafts, it is of course possible to apply this principle to other nonplanar workpieces in which the beam will impinge on the workpiece at differing angles of incidence. The principle is also adapted to other methods of producing the differing angles of incidence such as the direction of a pair of beams or a split single beam at differing angles of incidence on the workpiece surface in question.

The advantage of the signal being independent of the surface color reflectivity and utilizing only the specular component of the reflected light, it offers great advantage in the industrial situation since the intensity level is adequate for good signal strength and therefore reliability in the output signal of the photodetectors and also eliminates error due to differences in coloration of the surface.

This concept should therefore provide a practical noncontacting optical apparatus and method for determining surface roughness which is suitable for industrial application such as to avoid the above-described disadvantages of the mechanical stylus approach currently in use. The readout would be instantaneous and not require repositioning or multiple readings in order to produce reliable output signals and no substantial skills or relatively lengthy periods of time are necessary in order to set up or carry out the readings.

The relative intensity signal corresponding to the roughest acceptable part finish may be utilized to establish a limit detector, with rejection of any parts producing a signal corresponding to a rougher finish.

The signal could also be used in conjunction with machine tool controls as an in-process gauge application.

While electromagnetic waves of any suitable length as required in the derivation of the above equations could be used, laser sources provide a monochromatic beam which can be optically handled and as such enable ready implementation of the method.

The embodiments of the invention in which an exclusive property or privilege is claimed are defined as follows:

1. A method of evaluating the roughness of a surface comprising the steps of:
   directing a beam of parallel electromagnetic waves of a single wavelength at said surface at differing angles of incidence;
   detecting the intensity of the specular components of the reflected beam from each of said angles of incidence;
   generating a signal corresponding to the ratio of the intensities of said specular reflections, whereby said signal corresponding to said ratio intensity corresponds to the roughness of that surface independently of the reflectivity of said surface due to color.

2. The method according to claim 1 wherein said step of directing said beam at said surface at two differing incident angles, a beam is directed at said surface at portions thereof extending at differing angles to the beam whereby said differing angles of incidence are produced by a single beam.

3. The method according to claim 1 wherein said beam is directed at said surface and comprises a monochromatic light source plane polarized perpendicular to the incident plane.

4. The method according to claim 1 wherein said step of measuring the intensity of specular reflection by each of said angles of incidence comprises positioning photodetectors along angles of reflection corresponding to each of said angles of incidence.

5. A method of evaluating the surface finish of round shafts comprising the steps of:
   directing a parallel beam of monochromatic light at curved surface portions of said shaft so as to create differing angles of incidence of different portions of the beam;
   determining the intensity of specular reflections at differing angles of reflection corresponding to differing angles of incidence of portions of said beam onto said curved portions of said shaft;
   determining the relative intensities of said specular reflections;
   generating a signal corresponding to said relative intensities whereby said signal corresponds to the surface roughness of said shaft curved portions.

6. The method according to claim 5 wherein said monochromatic light beam is plane polarized normal to the beam direction and wherein said beam is directed at said shaft with said shaft extending transversely to the direction of said beam and positioned so as to intercept a portion of said beam.

7. The method according to claim 6 wherein said step of determining the intensities of the specular reflections of portions of said beam corresponding to said angles of incidence comprises the step of positioning photodetectors so as to receive the specular component of the reflected portions of said beam reflected from said shaft surface at angles of reflection corresponding to said angles of incidences of said shaft at respective portions of said shaft surfaces.

8. Apparatus for evaluating the surface finish of a surface comprising:
   a monochromatic parallel beam light source;
   means directing said light source at said surface at two differing angles of incidence;
   means for determining the relative intensity of specular reflection at each of said angles of incidence;
   means generating a signal corresponding to said relative intensity of specular reflections, whereby said signal corresponds to the roughness of said surface.

9. The apparatus according to claim 8 wherein said monochromatic parallel beam light source is plane polarized in a plane normal to the beam direction.

10. The apparatus according to claim 8 wherein said means for determining the relative intensity of the specular reflections from said surface at each of said angles of incidences comprises detector means positioned at differing angles of reflection corresponding to said respective angles of incidence producing signals corresponding to the intensity of said specular reflections at each of said angles of reflection, and further including means generating a signal corresponding to the ratio of said detector means signal.

11. The apparatus according to claim 8 wherein said means for directing said monochromatic parallel light beam at said test surface at differing angles of incidences thereto comprises means for directing portions of said beam at portions of said test surface at a differing angle to said beam, whereby said portions of said beam directed onto said respective portions of said test surface provide said differing angles of incidence.

12. The apparatus according to claim 11 wherein said light source monochromatic parallel beam further includes a plane polarized light beam normal to the direction of said light source beam.

13. The apparatus according to claim 11 wherein said means for detecting said relative intensity of said specular reflections comprises a pair of photodetector means positioned along differing angles of reflection corresponding to the angles of incidence of portions of said beam illuminating said test shaft surface, each of said photodetector means generating signals corresponding to the intensity of the specular reflection of portions of said light source beam and means further including means generating a signal corresponding to the ratio of said photodetector signals.

14. Apparatus for evaluating the surface finish of round shafts comprising:

a monochromatic parallel beam light source;

means for positioning said light source and a test shaft so as to cause said beam to intercept a curved surface of said shaft;

means detecting the intensity of the specular reflection of said portions of said beam intercepting said curved surface such as to create differing angles of incidence;

means sensing the relative intensity of the specular reflections from differing portions of said curved surface providing said differing angles of incidences of portions of said beams;

means generating a signal corresponding to said relative intensities, whereby said signal provides a corresponding indication of the surface roughness of said shaft independent of the variations in reflectivity of said surface due to variations in surface color.

15. The apparatus according to claim 14 wherein said means for positioning said test shaft with respect to said light source comprises a fixture having a bore adapted to receive said test shaft, said fixture further including a slot formed in said fixture to intercept said internal bore whereby said shaft exposed by said slot may be illuminated by said test source and wherein said fixture is positioned with said light source beam passing into said slot and illuminating portions of a shaft disposed in said bore.

* * * * *